Jan. 18, 1949.   C. L. MERSHON   2,459,669
REGULATING SYSTEM
Filed March 8, 1947
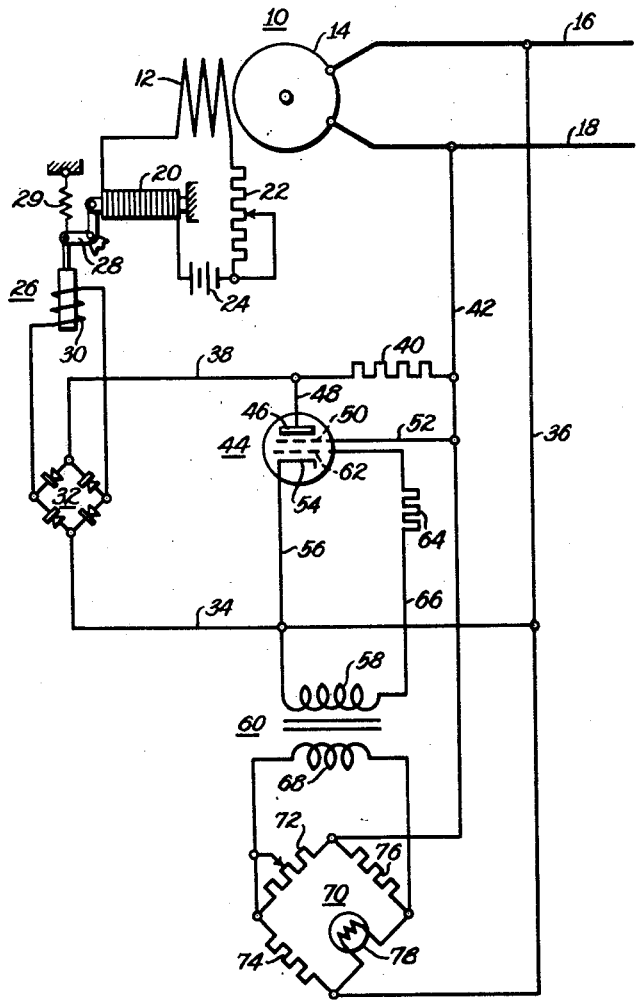
WITNESSES:
Robert C Baird
Mrs. L. Groome
INVENTOR
Clarence L. Mershon.
BY
James N. Ely
ATTORNEY Patented Jan. 18, 1949

2,459,669

UNITED STATES PATENT OFFICE 2,459,669

REGULATING SYSTEM

Clarence L. Mershon, Lima, Ohio, assignor to Westinghouse Electric Corporation, East Pittsburgh, Pa., a corporation of Pennsylvania Application March 8, 1947, Serial No. 733,346

8 Claims. (Cl. 322—28)

This invention relates to regulating systems of the rheostatic type.

Carbon pile regulators have recently been developed for use in aircraft. While these regulators have proven to be quite useful, being light weight and reasonably stable, it is found that they have limited accuracy because of mechanical friction, mechanical wear and temperature effects. Attempts have been made to modify the regulators and their control circuits to render them more accurate, but the solutions offered heretofore required the redesign of the regulator magnetic circuit and added considerable weight to the regulator.

An object of this invention is to provide in a regulator, for modifying the control circuit thereof to compensate for inaccuracies of the regulator.

Another object of this invention is to provide for compensating for inaccuracies of a regulator in a manner whereby failure of the compensating factor will not cause failure of the regulator.

A more specific object of this invention is to provide in a voltage regulating system, for trimming or modifying the magnetic control circuit for the regulator to correct for the inaccuracies in the operation thereof.

Other objects of this invention will become apparent from the following description when taken in conjunction with the accompanying drawing, the single figure of which is a diagrammatic illustration of apparatus and circuits embodying the teachings of this invention.

Referring to the drawing, there is illustrated a generator 10 disposed to be driven by any suitable prime mover (not shown) and provided with field windings 12, and armature windings 14 which are connected to load conductors 16 and 18. The field windings 12 are connected through a pile rheostat 20 and an adjustable resistor 22 to opposite terminals of a battery 24 or other suitable source of energy.

In order to control the pressure applied to the pile rheostat 20 and consequently control the resistance in the field winding circuit of generator 10, an electromagnet 26 is disposed to be connected through a pivoted crank arm 28 to one end of the pile rheostat 20. The crank arm 28 is normally biased by means of a spring 29 for applying pressure to the pile rheostat 20.

The electromagnet 26 is provided with a winding 30 which is connected across the output terminals of a dry type rectifier 32, one of the input terminals of which is connected by conductors 34 and 36 to load conductor 16, and the other input terminal of which is connected through conductor 38, resistor 40 and conductor 42 to load conductor 18. Thus, the potential across rectifier 32 and consequently the potential across energizing winding 30 of the electromagnet 26 would normally be a measure of the voltage across load conductors 16 and 18.

In order to render the regulating circuit just described more accurate, provision is made to modify the energization of winding 30 to compensate for the inaccuracies of the pile rheostat 20. For this purpose, a vacuum tube valve 44 is connected across conductors 34 and 38 being disposed to be controlled to vary its conductivity to effect a change in the potential impressed on the input terminals of the rectifier 32.

The valve 44 is of standard construction having an anode 46 connected by conductor 48 to conductor 38, a screen grid 50 connected by conductor 52 to conductor 42, a cathode 54 connected by conductor 56 to conductor 34 and to one terminal of the secondary winding 58 of transformer 60, and a control grid 62 connected through a grid resistor 64 and conductor 66 to the other terminal of the secondary winding 58 of the grid transformer 60. As illustrated, the primary winding 68 of the grid transformer 60 is connected across the output terminals of a resistance bridge circuit 70, the input terminals of which are connected to be supplied through conductors 36 and 42 in accordance with the voltage across load conductors 16 and 18.

The resistance bridge 70 is formed of series connected resistors 72 and 74 and series connected resistor 76 and a constant current device 78, the series connected resistors 72 and 74 being connected in parallel circuit relation with the other series connected leg. The primary winding 68 of the transformer 60 is connected across the bridge being connected to terminals disposed between resistors 72 and 74 and between resistor 76 and the constant current device 78. The constant current device 78 illustrated comprises a tube sold to the trade as Westinghouse type WL-788 and which has constant current characteristics so that it will maintain a constant current flow over a wide range of input voltage to the bridge circuit.

In operation the resistor 72 of the bridge 70 is adjusted with respect to the other resistors of the bridge to create an unbalanced condition for normal voltage conditions across load conductors 16 and 18. By unbalancing the bridge 70 in this manner, the transformer 60 is energized to provide a predetermined negative voltage on the grid 62 of the valve 44 during the half cycle that the anode is positive so that the conductivity of the valve 44 is set at the desired value.

Under normal operating conditions, the current flow through the rectifier 32 is dependent upon the voltage across conductors 16 and 18 and the pressure on the pile rheostat 20 is a direct measure of and is varied in accordance with changes in such voltage to thereby control the excitation of the generator 10. Thus, as the voltage across conductors 16 and 18 decreases from the predetermined value which is to be maintained, the energization of winding 30 is decreased to permit the spring 29 to apply more pressure to the pile rheostat 20 to decrease its resistance and thereby increase the excitation of generator 10 to return the voltage across conductors 16 and 18 to the predetermined regulated value. Conversely, if the voltage across conductors 16 and 18 increases from the predetermined value, then the energization of the winding 30 is increased to release the pressure on the pile rheostat 20 to effect a decrease in the excitation of generator 10 to return the voltage across conductors 16 and 18 to the predetermined regulated value.

During the normal operation of the system, the valve 44 is operative to aid in effecting a change in the energization of the winding 30 to change the excitation of the generator 10, for as the voltage across load conductors 16 and 18 departs from the normal regulated value, the resistance bridge 70 becomes more or less unbalanced than the initial unbalanced setting of the bridge, depending upon the direction of departure of the voltage, to vary the negative potential applied to the grid 62 and thereby vary the conductivity of valve 44. For example, if the voltage across conductors 16 and 18 tends to rise, the bridge 70 becomes more unbalanced with the result that such unbalance changes the output voltage impressed on the transformer 60 to impress a more negative voltage on the grid 62 to reduce the conductivity of valve 44. As the valve 44 becomes less conducting, less current flows through resistor 40 with the result that a larger voltage is impressed on the winding 30 to effect a release of pressure on the pile rheostat 20 to decrease the current flowing in the field winding 12. By decreasing the excitation of the generator in this manner, the voltage across conductors 16 and 18 is returned to its predetermined regulated value at which value the valve 44 is conducting depending upon the original unbalance of the resistance bridge 70.

If the voltage across conductors 16 and 18 tends to decrease, then the bridge 70 becomes less unbalanced and the negative voltage applied to grid 62 is decreased resulting in an increase in the conductivity of valve 44. As more current flows through the valve 44, the current through resistor 40 is increased, and a smaller voltage is impressed on winding 30 whereby the spring 29 functions to effect an increase in the pressure applied to the pile rheostat 20 to increase the excitation of generator 10 to return the voltage across conductors 16 and 18 to normal.

As is apparent from the foregoing, while valve 44 is conducting during the normal operation of the regulating system, such functioning of the valve 44 is secondary to the main energization of the winding 30 as a result of the departure from the predetermined value of voltage which is to be regulated.

If for some reason the pile rheostat 20 changes, as, for example, by reason of wear on the components of the pile, a given energization of winding 30 fails to effect an adjustment of the pressure on the rheostat 20 sufficiently to effect the required change in the excitation of generator 10 to maintain the predetermined value of voltage. Under such circumstances the conductivity of valve 44 is then automatically controlled to effect a recalibration or change in the energization of winding 30 to adjust the pressure sufficiently to effect the necessary change in the excitation of the generator 10.

For example, if the components of the pile rheostat 20 become worn so that a given energization of winding 30 fails to maintain sufficient pressure on the rheostat 20, and as a result the resistance in the field winding circuit of generator 10 is increased, thereby effecting a decrease in the voltage across conductors 16 and 18 from the predetermined value which such energization of winding 30 would normally maintain, the decrease in voltage across conductors 16 and 18 is directly reflected across the input terminals of the resistance bridge 70. As a result of such change in the voltage impressed across the bridge 70, the bridge becomes less unbalanced than the initially set unbalance with the result that a less negative voltage is impressed on grid 62 of valve 44. The less negative voltage on grid 62 permits the valve 44 to become conducting earlier in the half cycle with the result that more current flows through valve 44, and consequently through resistor 40, with the result that the voltage across winding 30 of the electromagnet 26 is reduced. As the energization of electromagnet 26 is reduced, the spring biased crank arm 28 applies more pressure to the components of pile rheostat 20 to decrease the resistance of the pile sufficiently to effect an increase in the excitation of the generator 10 and return the voltage across conductors 16 and 18 to the predetermined regulated value. In effect, the valve 44 and its controlling bridge circuit 70 functions as a trimmer for the electromagnet 26 to adjust the energization thereof to maintain a predetermined resistance of the pile rheostat 20 even though the components are worn.

The valve 44 and its controlling bridge 70 function regardless of the changes encountered in the pile rheostat 20 to modify the energization of the winding 30 to correctly effect an adjustment in the pressure applied to the rheostat 20 to obtain the required resistance necessary for maintaining the proper excitation of the generator 10. Regardless of whether the change in the pile rheostat 20 is one occasioned by reason of physical changes in the pile rheostat, such as by wear of the components thereof, or is occasioned by thermal conditions, such as by heating of the pile rheostat 20, the valve 44 cooperates to correct the energization of the winding 30 to maintain the required resistance in the field winding circuit of the generator.

The resistance bridge 70 is very sensitive and after having been initially adjusted to provide a predetermined unbalance, functions efficiently in response to changes in the voltage across load conductors 16 and 18 to control the negative voltage applied to the grid 62 of the valve 44. This is evident for when the input voltage to the bridge 70 changes, the voltage drop across the resistor 76 remains substantially constant and the entire voltage change appears across the constant current device 78. Thus, if a two-volt change should occur across the input terminals of the bridge 70, the entire two-volt drop would occur across the constant current device 18 and the voltage drop across the resistor 16 would be maintained at its original value, whereas the two-volt change across the series connected resistors 12 and 14 would be in proportion to their resistance. Thus, the voltage across the output terminals of the resistance bridge 10 would reflect substantially all of the two-volt change for controlling the bias of the valve 44.

The system described is efficient in operation, being formed of standard components, and can be readily duplicated. Where failure of the valve 44 is encountered, the system fails safely, that is, the winding 30 of the electromagnet 26 will still be energized in accordance with the voltage across conductors 16 and 18 even though the resulting energization of the winding 30 will be insufficient to maintain the correct resistance in the field winding circuit of generator 10. The system described utilizes a minimum of elements and does not require any change in the mechanical portions of the regulator.

I claim as my invention:

1. In a regulating system for maintaining a predetermined voltage across load conductors supplied by a generator having field windings, the combination comprising, a pressure responsive pile rheostat connected in circuit with the field windings to control the excitation of the generator, means disposed for operation to control the pressure applied to the pile rheostat, means disposed to be energized in response to the voltage across the load conductors to effect an operation of the pressure control means, a vacuum tube valve connected in circuit relation with said energized means to inversely affect the energization thereof as the conducting period of the valve is changed, and means responsive to deviations of the voltage across the load conductors from the predetermined value for controlling the conductivity of the valve, the valve thereby cooperating with said energized means to modify the energization thereof to compensate for changes in the pile rheostat and insure correct excitation of the generator to maintain the predetermined voltage.

2. In a regulating system for maintaining a predetermined voltage across load conductors supplied by a generator having field windings, the combination comprising, a pressure responsive pile rheostat connected in circuit with the field windings to control the excitation of the generator, the pile rheostat being subject to thermal and physical changes which affect the resistance thereof, means disposed to be energized in response to the voltage across the load conductors to control the pressure applied to the pile rheostat, a vacuum tube valve connected in circuit relation with said energized means to inversely affect the energization thereof as the conducting period of the valve is changed, and means responsive to deviations of the voltage across the load conductors from the predetermined value for controlling the conductivity of the valve, the valve thereby cooperating with said energized means to modify the energization thereof to compensate for thermal and physical changes in the pile rheostat and insure correct excitation of the generator to maintain the predetermined voltage.

3. In a regulating system for maintaining a predetermined voltage across load conductors supplied by a generator having field windings, the combination comprising, a pressure responsive pile rheostat connected in circuit with the field windings to control the excitation of the generator, means disposed for operation to control the pressure applied to the pile rheostat, means disposed to be energized in response to the voltage across the load conductors to effect an operation of the pressure control means, a resistance bridge connected in circuit relation with the load conductors to be supplied in response to the voltage thereacross to control the output of the bridge, a vacuum tube valve connected in circuit relation with said energized means to inversely affect the energization thereof as the conducting period of the valve is changed, the valve having a biasing control grid, and means for connecting the grid whereby the bias thereof is responsive to the output of the resistance bridge for controlling the conductivity of the valve, the valve thereby cooperating with said energized means to modify the energization thereof to compensate for changes in the pile rheostat and insure correct excitation of the generator to maintain the predetermined voltage.

4. In a regulating system for maintaining a predetermined voltage across load conductors supplied by a generator having field windings, the combination comprising, a pressure responsive pile rheostat connected in circuit with the field windings to control the excitation of the generator, the pile rheostat being subject to thermal and physical changes which affect the resistance thereof, means disposed to be energized in response to the voltage across the load conductors to control the pressure applied to the pile rheostat, a resistance bridge connected in circuit relation with the load conductors to be supplied in response to the voltage thereacross to control the output of the bridge, a vacuum tube valve connected in circuit relation with said energized means to inversely affect the energization thereof as the conducting period of the valve is changed, the valve having a biasing control grid, and means for connecting the grid whereby the bias thereof is responsive to the output of the resistance bridge for controlling the conductivity of the valve, the valve thereby cooperating with said energized means to modify the energization thereof to compensate for thermal and physical changes in the pile rheostat and insure correct excitation of the generator to maintain the predetermined voltage.

5. In a regulating system for maintaining a predetermined voltage across load conductors supplied by a generator having field windings, the combination comprising, a pressure responsive pile rheostat connected in circuit with the field windings to control the excitation of the generator, an electromagnet disposed to be energized to control the pressure applied to the pile rheostat, means for energizing the electromagnet in response to the voltage across the load conductors, a vacuum tube valve connected in circuit relation with said energized means to inversely affect the energization thereof as the conducting period of the valve is changed, and means responsive to deviations of the voltage across the load conductors from the predetermined value for controlling the conductivity of the valve, the valve thereby cooperating with said energized means to modify the energization thereof to compensate for changes in the pile rheostat and insure correct excitation of the generator to maintain the predetermined voltage.

6. In a regulating system for maintaining a predetermined voltage across load conductors supplied by a generator having field windings, the combination comprising, a pressure responsive pile rheostat connected in circuit relation with the field windings to control the excitation of the generator, means disposed for operation to control the pressure applied to the pile rheostat, means disposed to be energized in response to the voltage across the load conductors to effect an operation of the pressure control means, a vacuum tube valve connected in circuit relation with said energized means to inversely affect the energization thereof as the conducting period of the valve is changed, and a resistance bridge including a constant current element connected to be responsive to deviations of the voltage across the load conductors from the predetermined value for controlling the conductivity of the valve, the valve thereby cooperating with said energized means to modify the energization thereof to compensate for changes in the pile rheostat and insure correct excitation of the generator to maintain the predetermined voltage.

7. In a regulating system for maintaining a predetermined voltage across load conductors supplied by a generator having field windings, the combination comprising, a pressure responsive pile rheostat, a winding disposed to be energized in response to the voltage across the load conductors to control the pressure applied to the pile rheostat, a vacuum tube valve connected in circuit relation with the winding to inversely affect the energization thereof as the conducting period of the valve is changed, and a resistance bridge connected to be responsive to deviations of the voltage across the load conductors from the predetermined value for controlling the conductivity of the valve, the valve thereby cooperating with the energized winding to modify the energization thereof to compensate for changes in the pile rheostat and insure correct excitation of the generator to maintain the predetermined voltage.

8. In a regulating system for maintaining a predetermined voltage across load conductors supplied by a generator having field windings, the combination comprising, a pressure responsive pile rheostat, a winding disposed to be energized in response to the voltage across the load conductors to control the pressure applied to the pile rheostat, a vacuum tube valve connected in circuit relation with the winding to inversely affect the energization thereof as the conducting period of the valve is changed, and a resistance bridge including a constant current element connected to be responsive to deviations of the voltage across the load conductors from the predetermined value for controlling the conductivity of the valve, the valve thereby cooperating with the energized winding to modify the energization thereof to compensate for changes in the pile rheostat and insure correct excitation of the generator to maintain the predetermined voltage.

CLARENCE L. MERSHON.

REFERENCES CITED

The following references are of record in the file of this patent:

UNITED STATES PATENTS

| Number | Name | Date |
|---|---|---|
| 1,857,174 | Zucker | May 10, 1932 |
| 1,917,473 | Von Ohlsen | July 11, 1933 |